Patented Aug. 22, 1939

2,170,187

UNITED STATES PATENT OFFICE 2,170,187

LACQUER

Walter J. Clarke, Chatham, N. J., assignor to Bell Telephone Laboratories, Incorporated, New York, N. Y., a corporation of New York No Drawing. Application September 29, 1936, Serial No. 103,102

3 Claims. (Cl. 260—16)

This invention relates to lacquers and more particularly to flat lacquers.

In accordance with one method of forming flat lacquers, nitrocellulose or a nitrocellulose product is put in solution in a suitable solvent such as toluene, ethyl acetate, ethyl alcohol, etc. and an inert pigment or metallic soap is added as a flattening agent. Suitable inert pigments are aluminum silicate, powdered silica, whiting and barytes; and the metal soaps commonly used are aluminum stearate or zinc palmitate. These inert pigments and soaps while imparting a certain flattening to the lacquer do not produce such a smooth uniformly dull finish as is desired in certain cases, even if carefully incorporated by ordinary lacquer enamel grinding methods and, therefore, if a smoother surface is required the lacquer surface must be rubbed down to a dull gloss by a further operation. This increases the cost of the finishing operation and also the time of production.

An object of the present invention is therefore, an improved flat lacquer composition.

Another object is a lacquer composition which has the appearance of a rubbed down flat lacquer without the need of the rubbing operation.

A further object is a lacquer which has a dull rubbed flat appearance and which is perspiration resistant.

In accordance with the present invention these and other objects are attained by incorporating in a suitable lacquer solution a quantity of powdered silica gel. This material, which is a well-known absorbing agent, has been found to be a very superior flattening agent because the particles are easily wetted and gives the desired rubbed effect when only a comparatively small percentage is incorporated in the lacquer solution.

The effect of adding a flattening agent to a normally glossy lacquer is to produce small irregularities in the surface of the dried lacquer film from which light is reflected. It appears that the particles of powdered silica gel are so fine and uniform in size, and so easily dispersed by simple agitation rather than "grinding", that provided a sufficient amount of silica gel is uniformly dispersed in the lacquer, it will present a surface free from agglomerated particles and one from which light is uniformly scattered. The uniform scattering of all reflected light results in a dull finish similar to that presented by a rubbed down glossy lacquer. The appearance of a lacquer coating, which without silica gel will present a glossy finish, can be varied from a gloss to a "dull rubbed" or even a flat appearing finish by the addition of increasing amounts of the silica gel. In general, it has been found that the appearance of the lacquer finish depends upon the ratio between the resins and plasticizers, which are the gloss producing materials contained in the lacquer, and the silica gel.

A satisfactory "dull rubbed" finish may be obtained by the use of impalpable silica gel in an amount between 5 and 20% of the total non-volatile ingredients of the lacquer, dullness of the finish increasing with increase in the amount of silica gel used. By increasing the amount of this material to from 20 to 30% of the total non-volatile ingredients the appearance of the lacquer becomes increasingly "flat," and above 30% it becomes chalky and therefore undesirable for many purposes.

While this gloss reducing effect has been produced by using silica gel with various commercial nitrocellulose lacquers, particularly of the alkyd resin type, the following composition approximately in the amounts indicated for the volatile and non-volatile portions has been found to produce an excellent "dull rubbed" finish lacquer which is also to a large extent perspiration proof.

| | | |
|---|---|---|
| Impalpable silica gel | 14.97 | |
| ½ sec. nitrocellulose (dry) | 40.40 | Non-volatile portion 26.03% |
| 30 sec. nitrocellulose (dry) | 11.53 | |
| Alkyd resin | 18.13 | |
| Dibutyl phthalate | 14.97 | |
| | 100.00 | |

| | | |
|---|---|---|
| Toluol | 26.06 | |
| Ethyl alcohol | 7.84 | |
| Ethyl acetate | 45.76 | Volatile portion |
| Butyl acetate | 10.19 | |
| Butyl alcohol | 4.06 | |
| Cellosolve acetate | 4.06 | |
| Butyl Cellosolve | 2.03 | |
| | 100.00 | |

The composition of the base lacquer was determined on the basis of tests in which lacquer coatings of varying nitrocellulose, resin and plasticizer content were subjected to practical perspiration resistance tests. These immediately demonstrated that large amounts of resin or plasticizer are very undesirable. Nitrocellulose alone stands up well, but such films as coatings lack sufficient flexibility, adhesion and appearance. The addition of the resin and plasticizer to the nitrocellulose improves these properties, but for a lacquer that must show good perspiration resistance without noticeable softening, both resin and plasticizer must be present in relatively small amounts compared to the nitrocellulose. In this respect there is a distinct difference between the above composition, and the present commercial lacquers for the latter usually contain at least as much resin as nitrocellulose. According to the above formula, about four-fifths of the nitrocellulose is of low viscosity type and one-fifth is the medium viscosity grade which is typical in lacquer formulation for industrial spray use where greater toughness is desired and where a slightly heavier viscosity is not a disadvantage. A small amount of dibutyl phthalate is used because of its excellent plasticizing properties and also because lacquer films containing it discolor but little on aging. For the volatile portion of the lacquer any balanced combination of solvents may be used, although the ratio given in this formula contains approximately the right amount of high boilers, low boilers and diluents to be practically free from blush even under somewhat adverse conditions of temperature and humidity. Slight variations of a few per cent of each non-volatile constituent will not change the properties or the rubbed effect of this lacquer to any noticeable extent. Addition of ordinary "lacquer thinner" may be necessary for proper spray gun application.

In addition to its advantages as a finishing material, this lacquer has the further advantage that due to its satin-like finish resulting from the uniform distribution of fine particles of silica gel, it lends itself readily as a surface upon which to place pencil or ink marks. It therefore may be applied to transparent sheets of cellulose, cellulose ester or synthetic resinous materials to produce a satisfactory substitute for the tracing cloth now in common use.

The procedure for preparing a batch of the lacquer in accordance with the above formula is to first dissolve the two grades of nitrocellulose in a suitable solvent such as ethyl acetate and to dissolve the alkyd resin in toluene. The solutions are then blended by means of a rapidly rotating mechanism while the plasticizer and the remaining solvents are slowly added. When the clear base lacquer is thoroughly mixed, the required amount of powdered silica gel is gradually sifted in with rapid agitation. The lacquer is then preferably strained through several thicknesses of fine cheesecloth to remove any foreign particles or agglomerates that have not been dispersed. An additional advantage of using silica gel for flattening lacquers is that it dispenses with the necessity of grinding equipment since it becomes thoroughly dispersed simply by agitation.

If, however, it is not required that the lacquer be perspiration proof but instead only a flat lacquer is required, the choice of the resin is widened since the flattening effect of the silica gel is obtained with many of the synthetic and natural resins available on the market. Likewise, other plasticizers may be used when discoloration is not an important factor.

What is claimed is:

1. A perspiration-resistant lacquer composition consisting of the following ingredients in approximately the following proportions combined with volatile suitable solvents: nitrocellulose 52 parts, alkyd resin 18 parts, dibutyl phthalate 15 parts, impalpable silica gel 15 parts, said silica gel having been added as a powder at some stage of the preparation of the lacquer.

2. A perspiration-resistant lacquer film consisting of the following ingredients in approximately the following proportions: nitrocellulose 52 parts, alkyd resin 18 parts, dibutyl phthalate 15 parts, impalpable silica gel 15 parts, said silica gel having been added as a powder at some stage of the preparation of the lacquer.

3. A perspiration-resistant lacquer composition consisting of the following ingredients in approximately the following proportions combined with suitable volatile solvents: nitrocellulose 52 parts, alkyl resin 18 parts, dibutyl phthalate 15 parts, impalpable silica gel in an amount between about 5 and about 30 per cent of the total non-volatile ingredients of the lacquer, said silica gel having been added as a powder at some stage of the preparation of the lacquer.

WALTER J. CLARKE.